United States Patent
Bulman (10) Patent No.: US 8,763,361 B2
(45) Date of Patent: Jul. 1, 2014

(54) PROPULSION SYSTEM WITH MOVABLE THERMAL CHOKE

(75) Inventor: Melvin J Bulman, Fair Oaks, CA (US)

(73) Assignee: Aerojet-General Corporation, Sacramento, CA (US)

(*) Notice: Subject to any disclaimer, the term of this patent is extended or adjusted under 35 U.S.C. 154(b) by 672 days.

(21) Appl. No.: 12/811,910

(22) PCT Filed: Jan. 6, 2009

(86) PCT No.: PCT/US2009/030185
§ 371 (c)(1),
(2), (4) Date: Sep. 24, 2010

(87) PCT Pub. No.: WO2009/123770
PCT Pub. Date: Oct. 8, 2009

(65) Prior Publication Data
US 2011/0023451 A1    Feb. 3, 2011

Related U.S. Application Data

(60) Provisional application No. 61/019,421, filed on Jan. 7, 2008.

(51) Int. Cl.
*F02K 3/00* (2006.01)
(52) U.S. Cl.
USPC ........................................................ 60/243
(58) Field of Classification Search
CPC ............. F02K 9/82; F02K 1/28; F02K 1/002; F02C 7/057
USPC ................... 60/231, 233, 242, 243, 266, 267; 239/265.17, 265.23
See application file for complete search history.

(56) References Cited

U.S. PATENT DOCUMENTS

| | | | | |
|---|---|---|---|---|
| 2,971,327 A | * | 2/1961 | Moy et al. | 239/265.17 |
| 3,091,924 A | * | 6/1963 | Wilder, Jr. | 60/231 |
| 3,300,978 A | * | 1/1967 | Pennington | 60/231 |
| 3,788,069 A | | 1/1974 | Schmidt | |
| 3,925,982 A | * | 12/1975 | Mueller | 60/242 |
| 4,220,001 A | | 9/1980 | Beichel | |
| 4,369,920 A | * | 1/1983 | Schmidt | 239/127.3 |
| 4,686,824 A | * | 8/1987 | Dunaway et al. | 60/231 |
| 4,707,981 A | | 11/1987 | Wagner | |
| 5,619,851 A | * | 4/1997 | Johnson et al. | 60/267 |
| 6,220,016 B1 | * | 4/2001 | Defever et al. | 60/267 |
| 2006/0202082 A1 | | 9/2006 | Alvi | |

OTHER PUBLICATIONS

International Search Report dated Sep. 25, 2009, issued in related International Patent Application No. PCT/US2009/030185, Jan. 6, 2009.

* cited by examiner

*Primary Examiner* — Phutthiwat Wongwian
(74) *Attorney, Agent, or Firm* — Kilpatrick Townsend & Stockton LLP (57) ABSTRACT

High thrust at sea level and high Isp at high altitudes with low ambient pressure are obtained in a vehicle with an engine of fixed geometry including an exit of non-changing cross section, by incorporating a series of propellant injectors in a divergent section of the engine, spaced apart along the engine axis at points of different engine cross section. At takeoff, the injectors at sites with a large cross section are used, and as the vehicle climbs, these injectors are successively closed leaving injectors activated at sites of successively smaller cross sections. The injectors establish thermal choke points, and the area ratio of the cross section at the exit to the cross section at the thermal choke point thus increases as the vehicle climbs from low to high altitudes.

7 Claims, 7 Drawing Sheets

PROPULSION SYSTEM WITH MOVABLE THERMAL CHOKE

CROSS-REFERENCE TO RELATED APPLICATION

This application is the U.S. National Stage entry of International Application No. PCT/US2009/030185, filed Jan. 6, 2009, which claims the benefit to U.S. Provisional Application No. 61/019,421 filed Jan. 7, 2008, the contents of which are herein incorporated by reference in their entirety.

BACKGROUND OF THE INVENTION

1. Field of the Invention

This invention resides in the technology of engine design for rocket propulsion systems.

2. Description of the Prior Art

Rocket-powered launch vehicles require high thrust at takeoff due to the need to lift the vehicle from a standing position and also due to the vehicle weight which is greatest at takeoff because of the unburned fuel. For vehicles launched from the earth's surface, takeoff typically occurs at sea level while the vehicle performs its primary mission at high altitude where the external pressure is subatmospheric and often at high vacuum. The vehicle thus needs an engine that provides both a high thrust at sea level to reach high altitude and a high specific impulse $I_{sp}$ (the ratio of the thrust to the weight of fuel consumed in a unit of time) at high altitude where the rocket performs its mission. These are conflicting needs since high $I_{sp}$ is most readily achieved by a nozzle with a high area ratio, i.e., a high ratio of the cross-sectional area at the nozzle exit to the cross-sectional area at the throat, and yet at sea level, the expansion caused by a high area ratio produces an internal pressure at the nozzle wall near the nozzle exit that is below the external (atmospheric) pressure, resulting in a reverse pressure differential and thereby a negative thrust component, i.e., one whose direction is opposite to the forward direction of the vehicle.

The prior art offers several ways of eliminating the negative thrust component at low altitudes without compromising the thrust in the high vacuum environment of the higher altitudes. One is the use of a nozzle of variable exit area, in which the exit area is reduced for launch and then gradually increased during ascent. The variation is achieved by constructing the nozzle with the capability of adjustments to the contour, area ratio, and length of the nozzle as the vehicle altitude increases. These features add considerably to the complexity and weight of the engine construction, however, and they are less than fully successful since the nozzle in most cases continues to produce less thrust at sea level than at vacuum. Other methods have included the use of combination-type engines using different fuels at different stages. One such combination is the dual-fuel-dual-expander engine concept described by Beichel, R., in U.S. Pat. No. 4,220,001 (issued Sep. 2, 1980). The Beichel engine entails a nozzle of complex design that incorporates two thrust chambers. Among the various alternatives to the Beichel engine are engines in which secondary combustion gas is introduced near the wall of the divergent section of the nozzle, as described by Bulman, M., in U.S. Pat. No. 6,568,171 (issued May 27, 2003); engines with expansion-deflection and plug nozzles that incorporate secondary injectors, as described by Bulman, M., et al., in U.S. Patent Application Publication No. US 2007/0056261 A1 (published Mar. 15, 2007); and an engine with a throttling injector to achieve a variable area ratio, as described by Wagner, W. R., in U.S. Pat. No. 4,644,475 (issued Feb. 24, 1987).

In the Wagner engine, the injector is at the forward end of a divergent combustor, and the purpose of the throttling is to move the site within the combustor at which sonic conditions are achieved, from locations close to the forward end to sites approaching the nozzle throat. Controlling this from the forward end requires an injector that produces much finer and better mixed propellants at low thrust than at high thrust. Although this is theoretically achievable, it requires additional control of the combustion process such as multiple pintle injectors which leads to more complex and heavy engines.

Of further possible relevance to this invention are vehicles that are designed to undergo ascent, descent, or both in high-vacuum environments such as the surface of the moon. Such a vehicle requires very deep throttling when approaching a landing surface in a high-vacuum environment, in addition to the ability to vary its thrust upon takeoff depending on whether takeoff occurs in a high-pressure environment such as the surface of the earth or a low-pressure environment such as the surface of the moon.

SUMMARY OF THE INVENTION

The present invention resides in a rocket engine constructed as a single chamber with a fixed geometry, including a non-changing gas flow path and a non-variable exit area, but with a thermal choke point that moves along the axis of the engine in the direction of the forward end of the engine as the vehicle climbs and progresses from a high-pressure environment to a low-pressure environment. The thermal choke point is created by injectors in the internal wall of the engine and, by selective actuation of the injectors, the thermal choke point advances toward regions of successively lower cross-sectional area within the engine during flight. The plane in which the thermal choke point resides acts as a thermal throat, and the ratio of the cross-sectional area at the exit to that at the thermal choke point can be termed a "thermal choke area ratio" or a "thermal area ratio." In the engines of this invention, the thermal area ratio varies as the thermal choke point moves, progressing from a low initial ratio where the thermal throat is at its highest value to higher ratios where the thermal throat is progressively reduced. In operation of the engine, the exit static pressure can be maintained at or near the local ambient pressure, whether that pressure be atmospheric at sea level or reduced at altitudes, and yet the thrust at sea level can be much higher than at altitude. This provides the vehicle with both maximum thrust at sea level and a high $I_{sp}$ at altitude.

These and other features, embodiments, and advantages of the invention will become apparent from the descriptions that follow.

DETAILED DESCRIPTION OF THE INVENTION AND PREFERRED EMBODIMENTS

The geometries of engines that incorporate that features of this invention as well as the number and arrangement of injectors can vary. The injectors that are initially operating but successively closed during flight span a distance along the engine axis that extends between points that can be defined by the thermal choke area ratio at each point. The axial distance spanned by the successively closed injectors can thus be defined by the ratio of the thermal choke area ratio at the start (a relatively low value) and the thermal choke area ratio at the end (a relatively high ratio), i.e., a ratio of two ratios. In preferred embodiments, the ratio of the final thermal choke area ratio to the initial thermal choke area ratio is from about 1.5:1 to about 6:1, and more preferably from about 2:1 to about 4:1.

While the features defining this invention are capable of implementation in a variety of constructions, the invention as a whole will be best understood by a detailed examination of a specific embodiment. One such embodiment is shown in the drawings.

Figure 1:
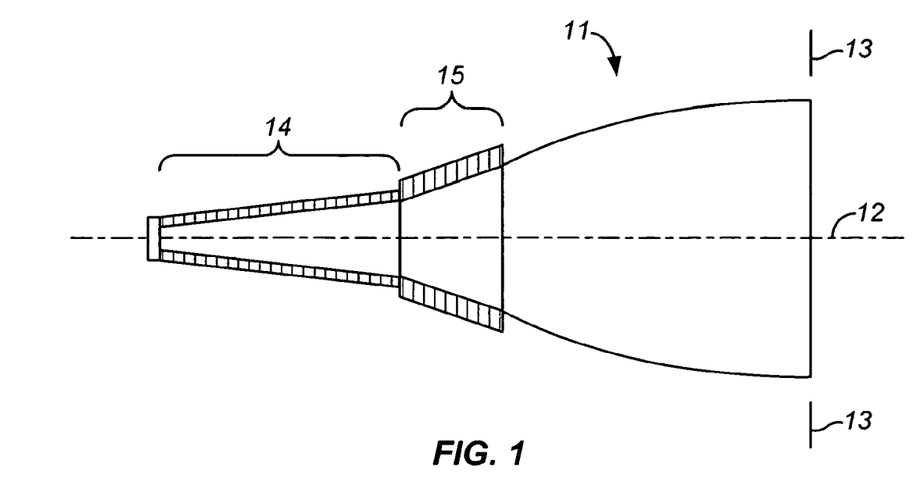
FIG. 1 is a longitudinal cross section of a rocket engine in accordance with the present invention, taken along the axis of the engine.

FIG. 1 depicts the divergent portion of a rocket engine 11 of the present invention. The engine is a body of revolution about a centerline 12, with combustion gas flowing from left to right (according to the view shown in the Figure), leaving the engine at an exit plane 13 at the right end, the cross-sectional area of the engine interior continuously increasing in the direction of gas flow. Two series of propellant injectors are built into the engine wall where the injectors are distributed around the wall circumference. The injectors include a primary series 14 at an upstream location and a secondary series 15 downstream of the primary series. Because of the increasing cross section of this portion of the nozzle, the primary series 14 of injectors is at a smaller nozzle cross section than the secondary series 15.

In successive stages of vehicle flight, propellant will be supplied through both the primary and secondary injectors at takeoff and at the early stages of flight. Once altitude is reached, supply to the secondary injectors will be discontinued, preferably in stages, ultimately leaving only the primary injectors as points of propellant introduction. Operation of the engine thus involves the use of all injectors, primary and secondary, at takeoff, and only the primary injectors at altitude. The secondary injectors are preferably arranged in groups so that the number of secondary injectors in operation can be decreased as the vehicle climbs and the ambient pressure drops. The thermal choke point, i.e., the location of the thermal choke along the nozzle axis, is the point or region where the combustion rate drops due to the consumption of the injected propellants, which then allows the gases so generated to accelerate past the local speed of sound to supersonic speeds for further expansion and acceleration in the remainder of the engine. The thermal choke point occurs at the last site of active injection, or slightly downstream of the last site. Within the active diverging combustor in which the injectors are located, the pressure and Mach number remain substantially unchanged as the number of injectors in use varies and the injected propellants combust to fill the increasing flow area. The injectors situated on the diverging wall are of an impinging design that inject the propellants in the form of very small droplets that mix rapidly and burn in a very short distance from their injection site.

Figure 2A:
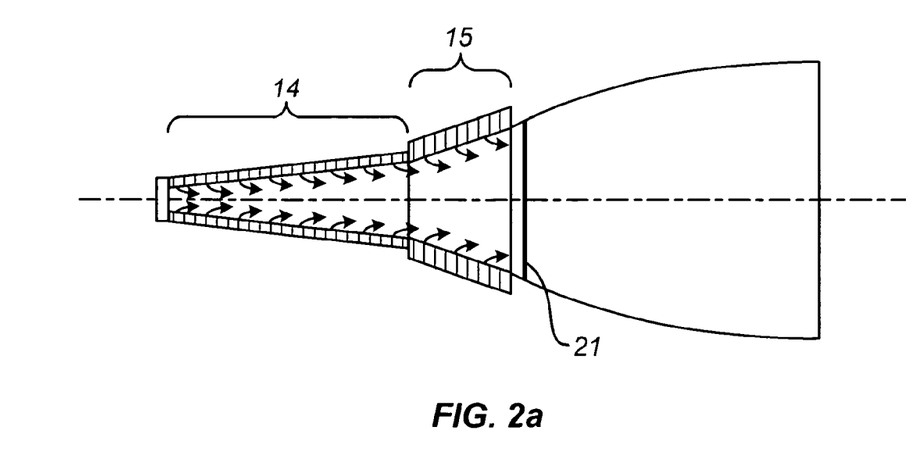
FIG. 2a is a view of the engine of FIG. 1 in the same cross section but with propellant injectors in a mode for takeoff.
Figure 2B:
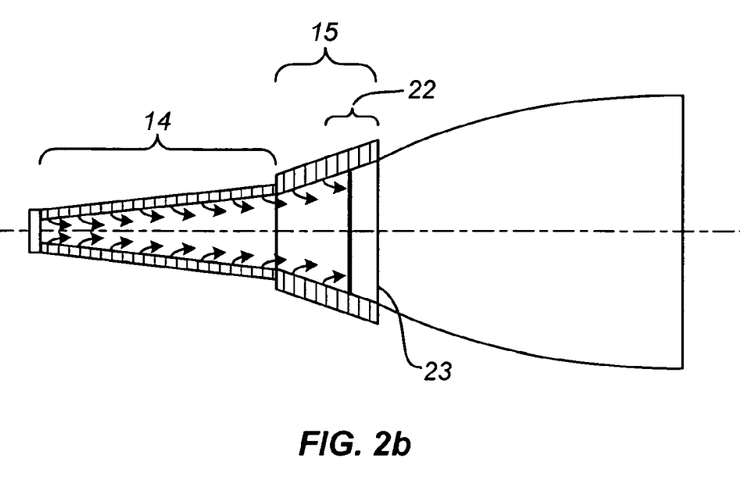
FIG. 2b is a view of the engine of FIG. 1 in the same cross section but with injectors in a mode for a stage subsequent to takeoff, with reduced ambient pressure.
Figure 2C:
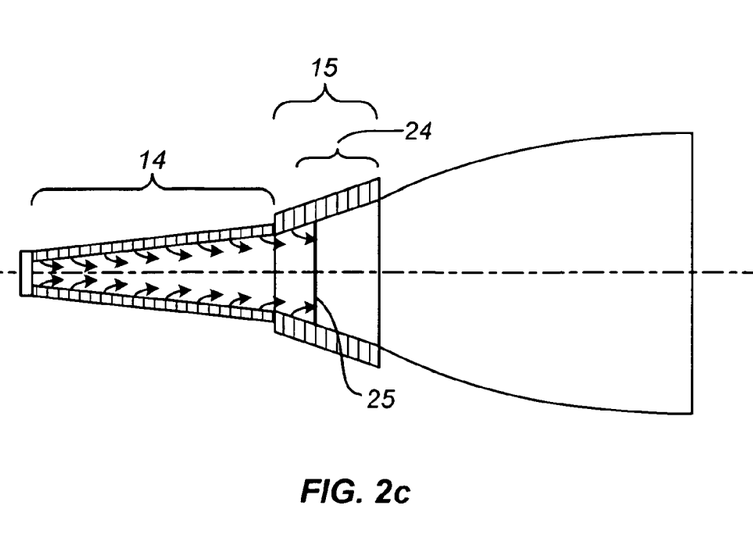
FIG. 2c is a view of the engine of FIG. 1 in the same cross section but with injectors in a mode for a further stage subsequent to takeoff, with further reduced ambient pressure.
Figure 3:
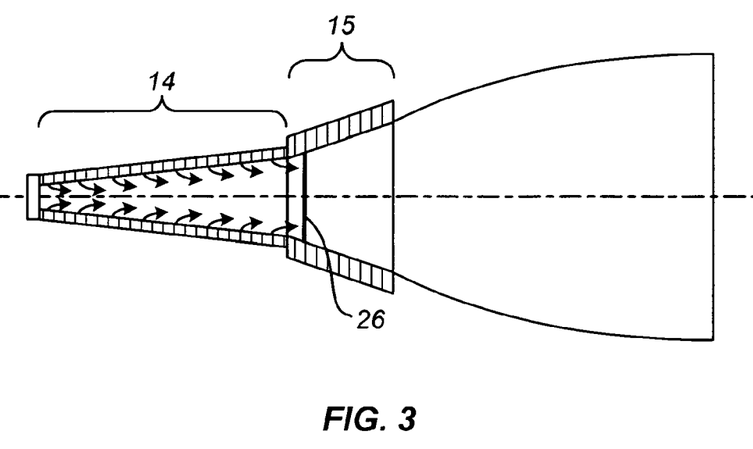
FIG. 3 is a view of the engine of FIG. 1 in the same cross section but with injectors in a final mode for maximum $I_{sp}$ at design altitude or higher.

An illustration of the successive activation of the secondary injectors and the resultant movement of the thermal choke point is presented in FIGS. 2a, 2b, 2c, and 3. FIG. 2a illustrates the nozzle at takeoff, with all injectors in use. A large thermal throat 21 forms at the location of the thermal choke point. FIG. 2b illustrates the nozzle at an early stage following takeoff, where the ambient pressure has dropped, and a portion 22 of the secondary injectors at the aft end has been shut off, leaving the remaining injectors in operation. A smaller throat 23 is formed at the location of the thermal choke point which has moved along the engine axis in the forward direction. FIG. 2c illustrates the nozzle at a later stage following takeoff, where the ambient pressure has dropped further. In FIG. 2c, a larger portion 24 of the secondary injectors at the aft end has been shut off, moving the thermal choke point further in the forward direction and consequently forming an even smaller thermal throat 25. FIG. 3 represents the nozzle operation at altitude, with none of the secondary injectors 15 operating and only the primary injectors 14 supplying propellant to the nozzle. The thermal choke point is now at its furthest point in the forward direction within the nozzle. The thermal throat is at its smallest area, and consequently the thermal area ratio is at its highest value.

Figure 4:
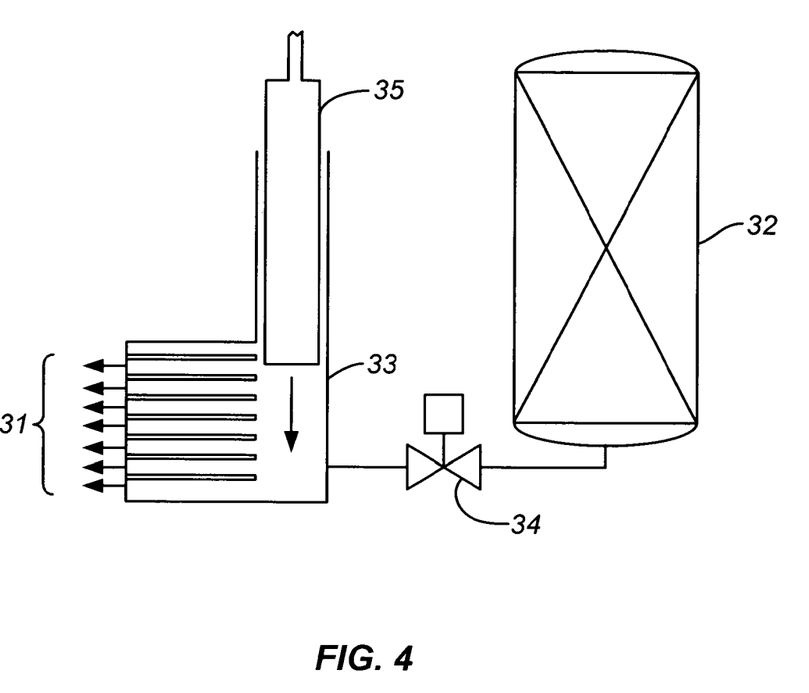
FIG. 4 is a cross section of a supply manifold for the injectors.

Operation of the secondary fuel injectors in the selective manner described above can be achieved by manifolds and valving structures that are either known or readily apparent to those skilled in the art. One example of a manifold that can serve this function is that described by Hewitt, R., in U.S. Published Patent Application No. 2007/0029408 A1, publication date Feb. 8, 2007. As shown in FIG. 4, the manifold contains a series of supply lines 31, each leading to a separate injector or group of injectors, a pressurized reservoir 32 for liquid fuel to feed the supply lines, a flow distribution chamber 33 between the reservoir and the supply lines, and a shutoff valve 34 between the reservoir 32 and the distribution chamber 33. A piston-like closure 35 resides inside the distribution chamber 33 and moves in the direction of the arrow 36 during the flight of the rocket. The closure 35 interrupts the flow to an increasing number of the supply lines 31 which are arranged such that the supply lines that are closed first as the closure is lowered are those that supply liquid fuel to the injectors closest to the exit plane of the rocket motor.

The following example is an illustration of the use of a rocket engine having the configuration shown in the Figures and described above.

EXAMPLE

An engine with a nozzle of conventional design (in accordance with the prior art) with a throat area of 100 square inches (0.0645 m$^2$) and an exit area of 2,280 square inches (1.47 m$^2$), resulting in an area ratio of 22.8:1, is operated at a chamber pressure of 1,000 psia (6,894 kPa) with liquid oxygen and the kerosene fuel known as RP-1. This nozzle produces a sea level thrust of about 140,000 lbf (623,000 newtons) and a sea level I$_{sp}$ of about 258 sec. If the vehicle weighs about 110,000 lbm (49.9 metric tons) per engine, the initial acceleration would be about 1.3 G's (1.3 times the acceleration due to gravity) and the net vertical acceleration would be about 9 ft/sec² (2.7 m/sec²). During the course of the climb of the vehicle, the thrust will rise slightly and level off at a value of about 180,000 lbf (800,640 newtons) and the $I_{sp}$ will rise slightly to level off at a value of about 315 sec.

In contrast, an engine of the present invention is proposed with the same geometry except for the inclusion of primary and secondary injectors as shown in the Figures hereto and with the secondary injectors positioned such that the initial thermal choke area ratio is 7.46, producing an initial $I_{sp}$ of 267 sec. As the vehicle climbs from sea level to an altitude of 36,000 feet (11,000 m), the secondary injectors, in use at takeoff, are shut off sequentially as shown in the Figures, moving the thermal choke in the forward direction within the nozzle and increasing the thermal choke area ratio to 22.8. The thrust is reduced from 420,000 lbf (1.86 Mn) at takeoff to about 150,000 lbf (667,000 newtons) when the last secondary injectors are shut off at 36,000 feet (11,000 m), and levels off at about 160,000 lbf (7.12M newtons) as the vehicle continues to climb, while the $I_{sp}$ rises steadily from 267 sec at takeoff to 295 sec when the last secondary injectors are shut off at 36,000 feet (11,000 m). The $I_{sp}$ levels off at about 307 sec as the vehicle continues to climb. The sea level thrust obtained with the nozzle of the present invention is thus three times higher than that of the conventional nozzle, and the $I_{sp}$ at sea level is 3.5% higher. As the nozzle reaches full altitude where the external pressure drops to vacuum, both the thrust and the $I_{sp}$ are likely to be slightly lower (by approximately 3.5%) than those of the conventional nozzle due to a predicted lower combustion efficiency and greater Rayleigh loss.

Figure 5:
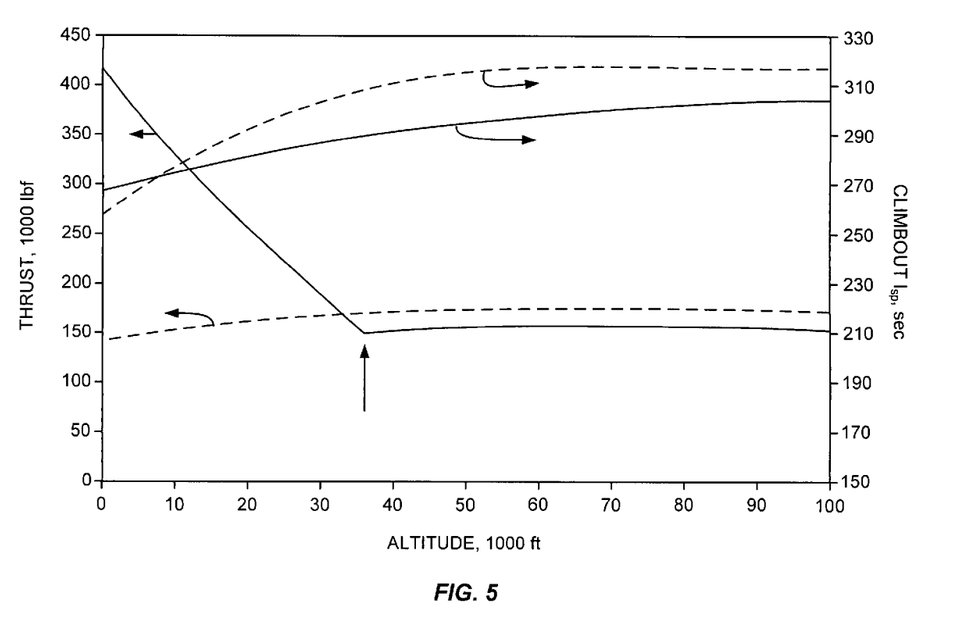
FIG. 5 is a plot of thrust and specific impulse as a function of altitude, comparing an engine of the present invention to one of the prior art.
Figure 6:
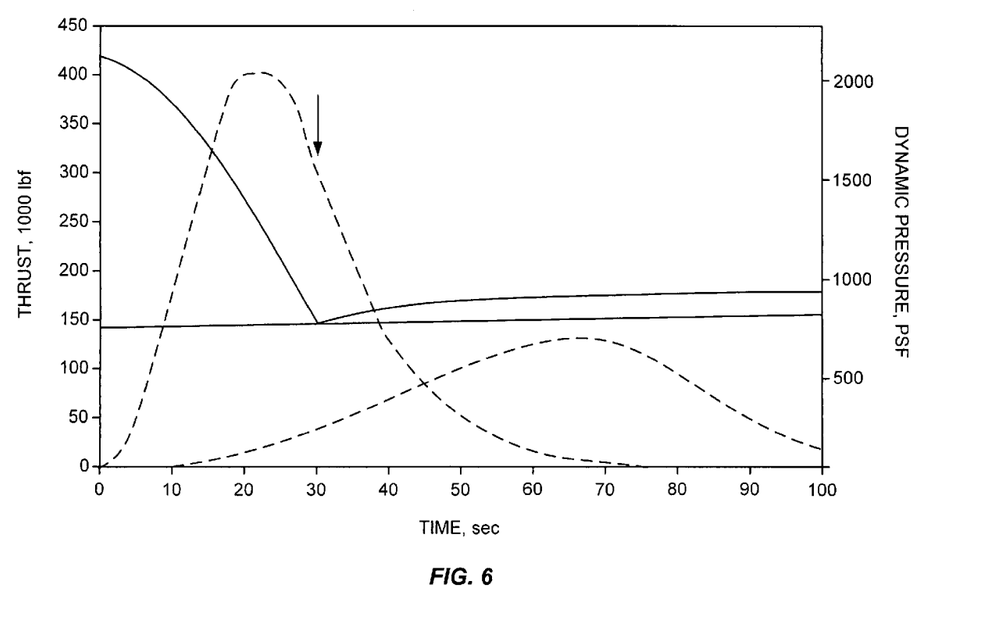
FIG. 6 is a plot of thrust and dynamic pressure as a function of time from takeoff, comparing an engine of the present invention to one of the prior art.
Figure 7:
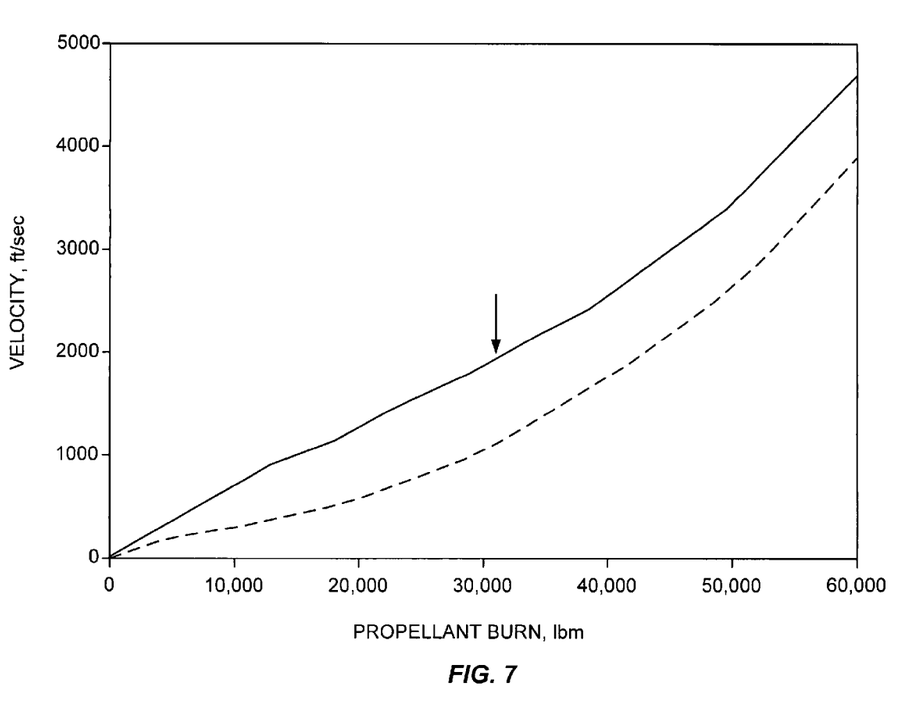
FIG. 7 is a plot of vehicle velocity as a function of the amount of propellant consumed, comparing an engine of the present invention to one of the prior art.

Comparisons between the conventional nozzle and the nozzle of the present invention described above are shown in FIGS. 5, 6, and 7. In FIG. 5, the thrust and $I_{sp}$ are both shown as functions of the altitude, and the secondary injectors are fully closed at 36,000 feet (11,000 m), leaving a fixed thermal choke area ratio at that altitude of 22.8. FIG. 6 shows the thrust and the dynamic pressure as a function of time from takeoff, with the secondary injectors fully closed at 30.0 seconds, and FIG. 7 shows the velocity as a function of the amount of propellant burnt, with the secondary injectors fully closed at 32,000 lbm of propellant burnt. In each of these plots, the dashed lines represent a conventional engine with a fixed mechanically choked nozzle of the prior art, the solid lines represent the moving thermal choke nozzle of the present invention, and the vertical arrows represent the point during the flight at which the secondary injectors are closed.

In the claims appended hereto, the term "a" or "an" is intended to mean "one or more." The term "comprise" and variations thereof such as "comprises" and "comprising," when preceding the recitation of a step or an element, are intended to mean that the addition of further steps or elements is optional and not excluded. All patents, patent applications, and other published reference materials cited in this specification are hereby incorporated herein by reference in their entirety. Any discrepancy between any reference material cited herein and an explicit teaching of this specification is intended to be resolved in favor of the teaching in this specification. This includes any discrepancy between an art-understood definition of a word or phrase and a definition explicitly provided in this specification of the same word or phrase.

What is claimed is:

1. A propulsion system that provides high thrust at sea level and high Isp at high altitudes, said propulsion system comprising an engine with a divergent section terminating in an exit plane of fixed area, and a plurality of primary and secondary propellant injectors in fluid communication with a propellant source, distributed along said divergent section and spaced apart in an axial direction, and a valving structure for selectively supplying combustible propellant to said plurality of primary and secondary injectors in a sequence that includes a successive closing of at least a part of the valving structure in fluid communication with said plurality of secondary propellant injectors from sites closest to said exit plane toward sites furthest from said exit plane.

2. The propulsion system of claim 1 wherein said secondary propellant injectors that are successively closed span an axial distance between a location that defines an initial thermal choke area ratio and a location that defines a final thermal choke area ratio, and the ratio of said final thermal choke area ratio to said initial thermal choke area ratio is from about 1.5:1 to about 6:1.

3. The propulsion system of claim 1 wherein said secondary propellant injectors that are successively closed span an axial distance between a location that defines an initial thermal choke area ratio and a location that defines a final thermal choke area ratio, and the ratio of said final thermal choke area ratio to said initial thermal choke area ratio is from about 2:1 to about 4:1.

4. The propulsion system of claim 1 wherein said plurality of primary and secondary propellant injectors are impinging injectors injecting droplets of liquid combustible propellant.

5. The propulsion system of claim 1 wherein said engine is a single-chamber engine of fixed geometry.

6. The propulsion system of claim 1 wherein said engine is a single-chamber engine of fixed geometry and is a body of revolution about an axis in said axial direction.

7. The propulsion system of claim 1 wherein selective actuation of said plurality of secondary injectors advances a thermal choke point of the system toward regions of successively lower cross-sectional area of the divergent section.

* * * * *